United States Patent [19]

Takeuchi

[11] Patent Number: 4,788,604
[45] Date of Patent: Nov. 29, 1988

[54] VIDEO SYSTEM WITH A SPECIAL REPRODUCTION MODE USING AN IMAGE MEMORY

[75] Inventor: Hisaharu Takeuchi, Kawasaki, Japan
[73] Assignee: Kabushiki Kaisha Toshiba, Kawasaki, Japan
[21] Appl. No.: 907,381
[22] Filed: Sep. 15, 1986
[30] Foreign Application Priority Data
Sep. 25, 1985 [JP] Japan .................. 60-210160
[51] Int. Cl.⁴ ........................... H04N 5/782
[52] U.S. Cl. .................. 360/10.3; 360/36.2; 358/339
[58] Field of Search .......... 360/10.3, 36.1, 36.2, 360/37.1; 358/310, 312, 320, 339

[56] References Cited

U.S. PATENT DOCUMENTS

| | | | |
|---|---|---|---|
| 4,443,821 | 4/1984 | Kato | 360/36.2 X |
| 4,456,932 | 6/1984 | Honjo et al. | 360/36.1 |
| 4,511,931 | 4/1985 | Bixby | 360/10.3 |
| 4,604,658 | 8/1986 | Hikino et al. | 360/36.2 |

FOREIGN PATENT DOCUMENTS

| | | |
|---|---|---|
| 57-80880 | 5/1982 | Japan ................ 360/10.3 |
| 60-193741 | 1/1985 | Japan . |

Primary Examiner—Aristotelis M. Psitos
Attorney, Agent, or Firm—Cushman, Darby & Cushman

[57] ABSTRACT

An image memory control device for a video signal special reproduction system comprises a write-in section for writing in a video signal including a signal wherein the number of horizontal scan lines per field period is a multiple of 0.5 or not a multiple of 0.5 to a memory during one field period, selection signal generation section for generating a first selection signal or a second selection signal when it is determined that the number of horizontal scan lines per field period of the video signal which is written in the memory is close to an integer or close to a multiple of one-half, respectively, and readout section for repeatedly reading out a number of times the video signal to be subjected to special reproduction which is written in the memory, in response to the designation of the special reproduction mode, by selectively renewing a read-out address of the memory into a starting address at elapsed one field period of the video signal or at elapsed sum or difference period between one field period of the video signal and ½ horizontal scan period, in response to the output signal from the selection signal generating section, so that the number of horizontal scan lines corresponding to a transient portion of adjacent fields of a readout video signal is constantly an integer or a multiple of one-half having a constant fraction smaller than ±¼.

17 Claims, 7 Drawing Sheets

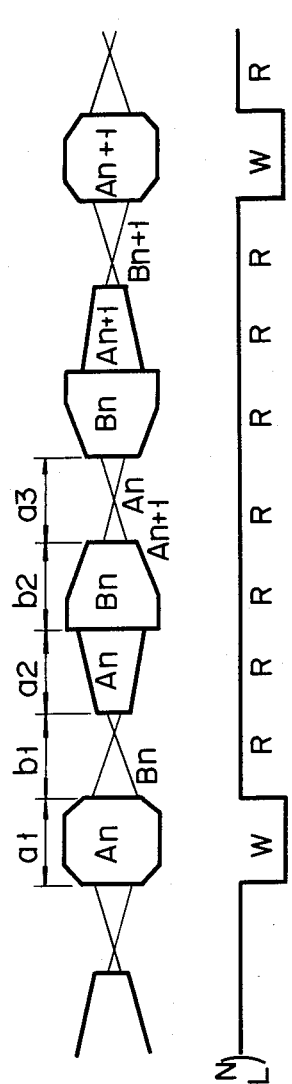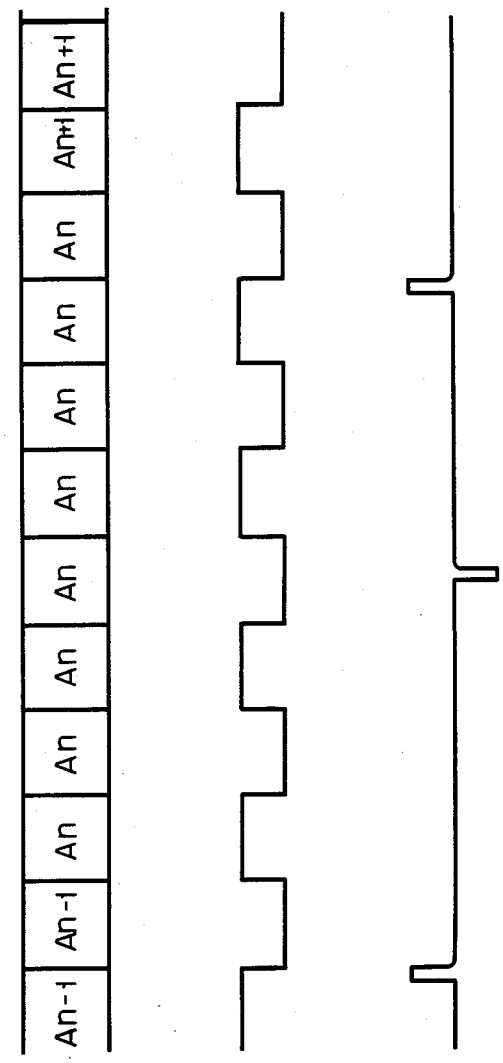
FIG. 2A (ENVELOPE OF REPRODUCED OUTPUT)
FIG. 2B (MEMORY WRITE-IN READ-OUT SIGNAL)
FIG. 2C (OUTPUT)
FIG. 2D (HEAD CHANGE PULSE)
FIG. 2E (REPRODUCTION CONTROL SIGNAL)

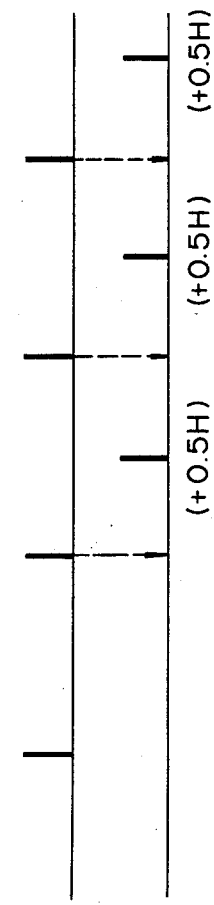
FIG. 5A (REPRODUCED VIDEO SIGNAL)
FIG. 5B (WRITE-IN/READ-OUT SIGNAL)
FIG. 5C (OUTPUT VIDEO SIGNAL)
FIG. 5D (TIMING PULSE)
FIG. 5E (CLEAR PULSE (AMOUNT OF SHIFT))

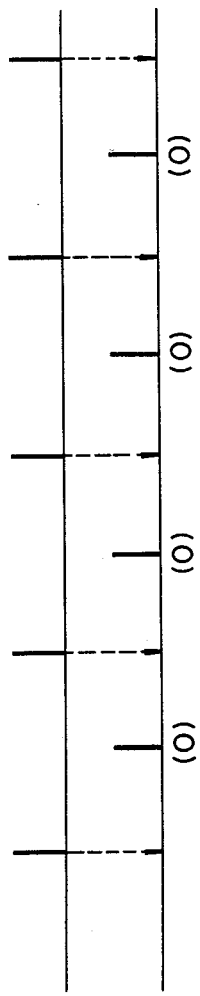
FIG. 6A (REPRODUCED VIDEO SIGNAL)
FIG. 6B (WRITE-IN/READ-OUT SIGNAL)
FIG. 6C (OUTPUT VIDEO SIGNAL)
FIG. 6D (TIMING PULSE)
FIG. 6E (CLEAR PULSE (AMOUNT OF SHIFT))

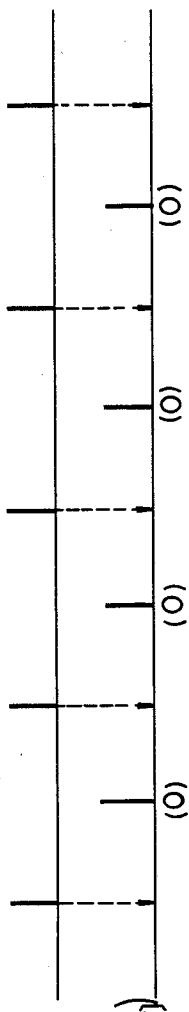
FIG. 7A (REPRODUCED VIDEO SIGNAL)
FIG. 7B (WRITE-IN/READ-OUT SIGNAL)
FIG. 7C (OUTPUT VIDEO SIGNAL)
FIG. 7D (TIMING PULSE)
FIG. 7E (CLEAR PULSE (AMOUNT OF SHIFT))

VIDEO SYSTEM WITH A SPECIAL REPRODUCTION MODE USING AN IMAGE MEMORY

BACKGROUND OF THE INVENTION

This invention relates to an image memory control device for a video signal special reproduction system and, more particularly, to an image memory control device which is suitable to be adapted for a video tape recorder (to be referred to as a VTR hereinafter) for performing noiseless special reproduction.

As is well known, in a helical scan type VTR, helical video tracks are formed on a magnetic tape to be inclined with respect to the travel direction. In the VTR of this type, special reproduction is performed by driving the tape at a speed different to that in the recording mode, thereby allowing slow-motion reproduction or high-speed reproduction. Alternatively, the tape is stopped and a still image is reproduced. In such special reproduction, the video head of the VTR may sometimes not trace a video track of the tape correctly, but helically trace over a plurality of video tracks simultaneously, thus leading to noise in the image.

Various countermeasures are conventionally proposed to prevent noise. One of the countermeasures uses a field memory.

For example, when slow-motion reproduction is performed by continuously running the tape at $\frac{1}{4}$ speed of that in the recording mode, every 8th field can provide an output which is substantially completely free from noise. The reproduced output of the field free from noise is stored in a field memory. Thereafter, when a field subject to noise or degraded image quality is to be reproduced, the signals stored in the memory are read out and are output instead of the reproduced output, so that a special reproduction image without noise can be obtained.

When a special reproduction image is obtained using a field memory of this type, the continuity of the signals on the screen must be maintained.

In an NTSC television signal, one field consists of 262.5 horizontal scan lines. Therefore, in a still image reproduction, when the memory signals are read out in units of fields, a skew of $\frac{1}{2}$ H (H: horizontal scan line) appears between two adjacent fields on the screen.

In a home VTR, two video heads having different azimuth angles are mounted on a rotational disk at an angle of 180° from each other. 1-track 1-field video signals are recorded on a magnetic tape travelling at a predetermined speed such that video tracks of every other field are formed helically on the magnetic tape.

In the home VTR of this type, video signals are recorded on the magnetic tape such that a positional shift of horizontal sync signals, called H, is formed between adjacent video tracks. When the video heads helically trace the video tracks in the manner as described above, the number of horizontal scan lines in the signals reproduced during a half rotation period of the disk, i.e., the signals reproduced by one video head, deviates from the correct value. For example, the number of horizontal scan lines of one field of NTSC television signals deviates from 262.5. This number varies according to the travel speed of the magnetic tape (FIG. 3).

Therefore, even during special reproduction other than the still image reproduction described above, such as slow-motion reproduction or high-speed reproduction, if only a field memory is used, a skew in accordance with the tape travel speed appears on the screen. In this case, a skew of $\frac{1}{2}$H or more poses a practical problem.

In this manner, since the number of horizontal scan lines changes in accordance with the tape travel speed, a large skew ($\frac{1}{2}$H in the worst case) sometimes appears on the screen. In other words, some values of a tape travel speed cannot be practically used due to undesirable skew.

In a special reproduction system using a field memory, optimum skew correction must be performed in accordancewwith the tape travel speed.

SUMMARY OF THE INVENTION

It is, therefore, an object of the present invention to provide a new and improved image memory control device for a video signal special reproduction system which can perform optimum skew correction in accordance with a tape travel speed which varies, so that a skew distortion may substantially not appear on a screen.

According to the present invention, there is provided an image memory control device for a video signal special reproduction system, the device comprising:

special reproduction mode designating means for designating at least one special reproduction mode among still image reproduction, slow-motion reproduction, and high-speed reproduction;

a video signal supply source for special reproduction for outputting a video signal to be subjected to special reproduction in a special reproduction mode which is designated by the special reproduction mode designating means;

A/D converting means for A/D-converting the video signal which is output from the video signal supply source for special reproduction to be subjected to special reproduction;

memory means having a memory capacity capable of storing about one field period of the video signal to be subjected to special reproduction which is A/D-converted by the A/D converting means;

write-in means for supplying a write signal for starting write-in of the video signal to be subjected to special reproduction which is A/D-converted by the A/D converting means into the memory means at a predetermined timing and for stopping the write-in at elapsed about one field period of the video signal;

selection signal generating means for generating a first selection signal or a second selection signal when it is determined that the number of horizontal scan lines per field period of the video signal which is to be subjected to special reproduction in a mode designated by the special reproduction mode designating means is close to an integer or close to a multiple of one-half, respectively;

readout means for repeatedly reading out a number of times the video signal to be subjected to special reproduction which is written in the memory means, in response to a mode designated by the special reproduction mode designating means, by renewing a read-out address of the memory means into a starting address at elapsed one field period of the video signal when receiving the first selection signal or by renewing a read-out address of the memory means into a starting address at elapsed sum or difference period between one field period of the video signal and $\frac{1}{2}$ horizontal scan period when receiving the second selection signal, so that the number of horizontal scan lines corresponding to a transient portion of adjacent fields of a readout video signal is constantly an integer or a multiple of one-half having a constant fraction smaller than $\pm\frac{1}{4}$; and D/A converting means for D/A-converting the video signal read out from the memory means, in order to obtain a special reproduction output.

BRIEF DESCRIPTION OF THE DRAWINGS

These and other objects and features of the present invention can be understood through the following embodiment by reference to the accompanying drawings, in which:

FIGS. 1, 2A to 2E, and 3 are views for explaining the principle of the present invention, in which FIG. 1 is a view for explaining a video track pattern of a magnetic tape used in a VTR, and a tracing state of video heads, FIGS. 2A to 2E are waveform charts for explaining the operation of a conventional special reproduction system using a field memory, and FIG. 3 is a graph showing a relationship between the number of horizontal scan lines per field in a special reproduction mode of a home VTR and a memory control period of the present invention;

FIGS. 5A to 5E, 6A to 6E, and 7A to 7E are waveform charts showing different operating states of the embodiment shown in FIG. 4, respectively.

DETAILED DESCRIPTION OF THE PREFERRED EMBODIMENT

The principle of the present invention will primarily be described.

Figure 1:
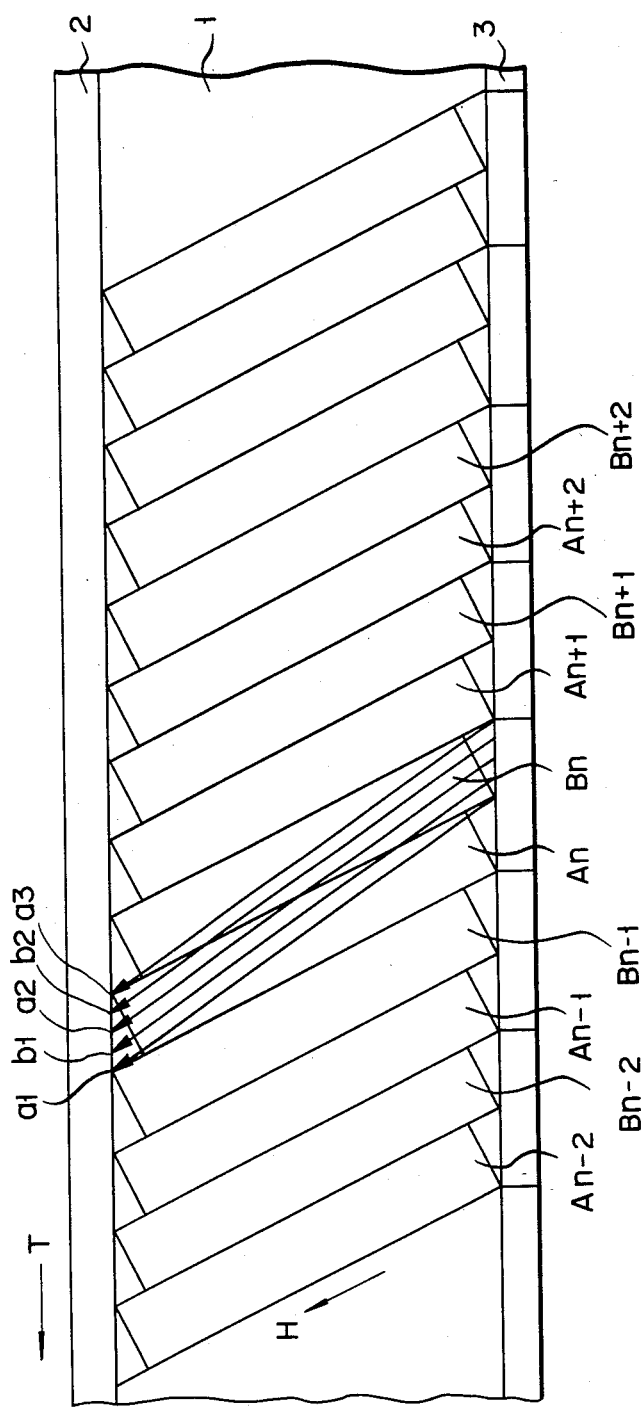

FIG. 1 shows a video track pattern of a magnetic tape used in a home VTR and a tracing state of the video heads in the special reproduction mode.

When two video heads are denoted as A and B, as shown in FIG. 1, video tracks A (n-2, n-1,. . .) are formed on magnetic tape 1 by video head A, and video tracks B (n-2, n-1,. . .) are formed on magnetic tape 1 by video head B. In FIG. 1, arrow T indicates the travel direction of tape 1 in the recording mode, and arrow H indicates the tracing direction of video heads A and B. Reference numeral 2 denotes an audio signal track; and 3, a control track on which a control signal representing the position of the video signal track is recorded. The control signal is based on a vertical sync signal extracted from a recorded video signal.

In reproduction of the magnetic tape pattern shown in FIG. 1, when the travel speed of tape 1 is set at $\frac{1}{4}$ of that in the recording mode, the tracing state of video heads A and B is as indicated by arrows a1, a2, a3, b1, and b2. Arrows a1, a2, and a3 indicate traces formed by head A, and arrows b1 and b2 indicate traces formed by head B. Each trace is the path of the central portion of a head.

Envelopes of reproduced signals in this state are shown with reference to periods a1 to a3, and b1 and b2 shown in FIG. 2A. As shown in FIG. 2A, the level of a reproduced signal is low in periods b1 and a3 during which heads A and B trace video tracks having different azimuth angles. Thus, noise appears on the screen in this low-level period.

A timing for providing a perfect reproduced output in period a1 in FIG. 2A varies in accordance with the tape travel speed and the tracking state. For this reason, the phase of the disk with respect to the tape travel is controlled so that a head change pulse (shown in FIG. 2D) formed from a pulse for detecting the rotating phase of the disk and a signal of reproduction control shown in FIG. 2E have predetermined phases. As a result of this phase control, the number of fields (from reception of a reproduction control signal) after which a substantially perfect reproduced output is obtained is determined in advance in accordance with the tape travel speed. Therefore, signals can be recorded at this timing and read out in units of field periods thereafter. Note that FIG. 2B shows memory write-in/read-out signal W/R, and that FIG. 2C shows an output signal.

With the memory control based on the above concept, however, the number of horizontal scan lines varies in accordance to the tape travel speed, and discontinuity in the signal occurring between adjacent fields, i.e., skew appearing on the screen cannot be corrected appropriately.

Figure 3:
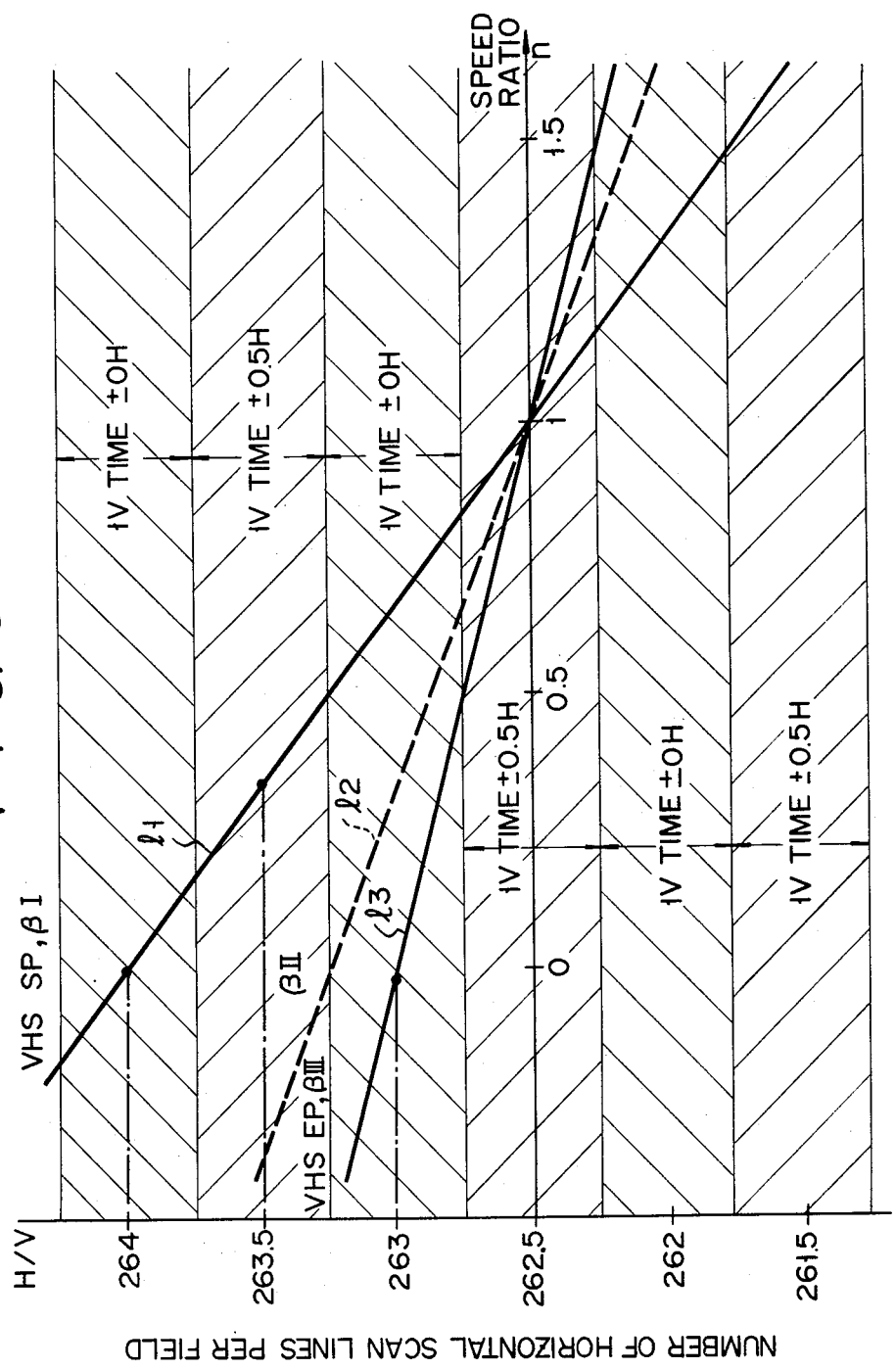

According to the present invention, the write-in or read-out period with respect to the memory is controlled to fall in a range of 1 field [V]$\pm$0 H in the hatched region of rightwardly oblique lines in FIG. 3 and 1 field [V]$\pm\frac{1}{2}$H in the hatched region of leftwardly oblique lines in FIG. 3, respectively, in accordance with whether the number of horizontal scan lines per field period is close to an integer or close to semiinteger. As a result, the value of skew at an arbitrary tape travel speed is $\pm\frac{1}{4}$H or less, so that the skew on the screen does not stand out.

In FIG. 3, the number H/V of horizontal scan lines (H) in one field (V) is plotted along the axis of cordinate, and ratio n of the tape travel speed in the play mode to the tape travel speed in the recording mode is plotted along the axis of abscissa. Line l1 represents SP (standard-play) mode of the VHS-type VTR and βI mode of the beta-type VTR, line l2 represents βII mode of the beta-type VTR, and line l3 represents EP (extended-play) mode of the VHS-type VTR and III mode of the beta-type VTR.

The present invention based on the above principle will now be described in detail with reference to the accompanying drawings.

Figure 4:
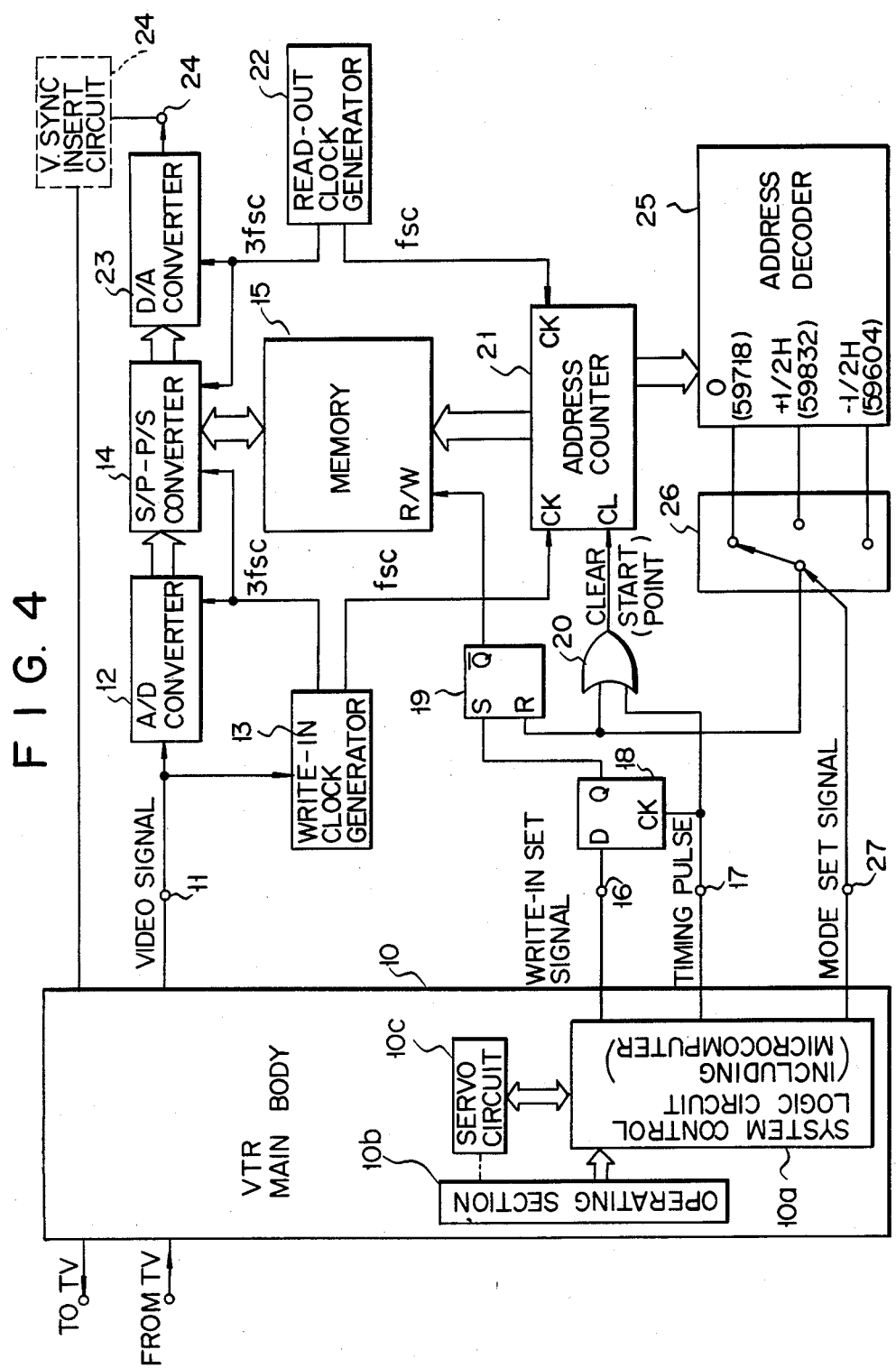
FIG. 4 is a block diagram of an embodiment of the present invention.

FIG. 4 is a block diagram of an embodiment of the present invention applied to a home VTR.

An analog VTR reproduced signal from VTR main body 10 is supplied to A/D converter 12 through input terminal 11, and is converted into a digital signal in accordance with a sampling pulse signal supplied from write-in clock generator 13. Generator 13 extracts a color burst signal from the VTR reproduced signal to form a 3-fsc (fsc is a chrominance subcarrier frequency) pulse phase-locked with the color burst signal, and supplies the 3-fsc pulse to A/D converter 12 as a sampling pulse. The VTR reproduced signal sampled by A/D cotverter 12 is quantized by 6 or 8 bits and is output.

The output of converter 12 is supplied to S/P-P/S converter 14. Converter 14 converts every 3 sampled values of the output from converter 12 from serial signals to parallel signals in accordance with the 3-fsc pulse supplied from generator 13. This is performed to slow down the speed of the signal so as to match with the operation time of memory 15.

Write-in to memory 15 is performed by applying a timing pulse to terminal 17 when a write-in set signal is supplied to terminal 16. More particularly, the write-in set signal is supplied to memory 15 through D flip-flop 18 and flip-flop 19, and sets memory 15 in a write-in state. The timing pulse in this case is a frame-frequency signal obtained on the basis of a head switching pulse for switching the video signals reproduced by two video heads (not shown) of VTR main body 10 for special reproduction or for both normal reproduction and special reproduction. The timing for generating this timing pulse is 4.5 to 9 H prior to the vertical sync signal of the VTR reproduced signal. The timing pulse is also supplied to clear terminal CL of address counter 21 via OR gate 20 as a clear pulse in order to set an initial address of memory 15. Thereafter, pulse signals having a frequency of fsc are sequentially supplied to terminal CK of address counter 21 as clock pulses from generator 13 to sequentially set the address of memory 15, and digital video signals are written in memory 15. The clock pulse is obtained by frequency-dividing, e.g., the sampling pulse for A/D conversion to $\frac{1}{3}$.

In a read-out mode, a pulse signal having stable frequency fsc is supplied from read-out clock generator 22 to terminal CK of address counter 21 as a clock signal. A digital video signal is read out from memory 15 in response to the count of address counter 21, is converted again into a serial signal from a parallel signal by S/P-P/S converter 14, and is supplied to D/A converter 23. A video signal converted into an analog signal by converter 23 is supplied to output terminal 24, and is supplied to a TV receiver (not shown) via VTR main body 10. In this case, a 3-fsc pulse signal phase-locked with the address clock is supplied from clock generator 22 to converters 14 and 23, so that converters 14 and 23 execute operation in accordance with the pulse signal.

Address decoder 25 and multiplexer 26 are provided in order to prevent occurrence of a skew or to prevent adverse influence of a skew on the image in the write-in or read-out operation of memory 15 as described above. Multiplexer 26 is controlled by a mode set signal which is supplied in a special reproduction mode (described later) from system control logic circuit 10a via terminal 27 in response to the operation by operating section 10b of VTR main body 10.

Assume that 1-field VTR normal reproduced signals are written in memory 15 and are continuously read out to obtain a still image.

In this case, as shown in FIG. 3, the number H/V of horizontal scan lines, e.g., the horizontal sync signal within 1 field is 262.5 (NTSC). Thus, the reproduced video signal of the VTR is as shown in FIG. 5A. When this signal is written in memory 15 for 1-field period, a fractional horizontal scan period of $\frac{1}{2}$H is present at a transient portion of adjacent fields in the read mode, which leads to a skew of $\frac{1}{2}$H period. In order to prevent this, in the write-in mode, an additional $\frac{1}{2}$ H period is added to the 1-field period of 262.5 H so that the signal is written in memory 15 during the 263 H period. More particularly, while the write-set signal is supplied to terminal 16 shown in FIG. 4, when the timing pulse shown in FIG. 5D is supplied to terminal 17, write-in signal W shown in FIG. 5B is supplied to memory 15, thereby performing signal writing. Thereafter, when 1 field and $\frac{1}{2}$H period (263 H period) has elapsed, a clear pulse shown in FIG. 5E clears address counter 21 and resets flip-flop 19 simultaneously, and read-out signal R as shown in FIG. 5B is supplied to memory 15. The clear pulse is obtained in the following manner. The 1 field and $\frac{1}{2}$H period (263 H period) corresponds to address 59832, which is obtained by:

(the number of addresses within 1 H) × (number of H periods within 1 field [V]) + (the number of addresses within 1/2 H) − 1 =

(455/2) × (525/2) + (455/2 × 1/2) − 1 =

59831.5

59831.5 is rounded to an integer 59832. In the above equation, the term (−1) is included because the address starts from "0". The error caused by this rounding is (1/fsc × $\frac{1}{3}$) ≈ 140 ns, which poses no practical problem. When multiplexer 26 is controlled by the mode set signal for still image reproduction which is supplied from terminal 27 so that the detection output of address decoder 25 corresponding to memory address 59832 is selected, the clear pulse shown in FIG. 5E is obtained as an output from multiplexer 26. The clear pulse is supplied to address counter 21 via OR gate 20 and resets flip-flop 19 simultaneously. Read-out signal R a shown in FIG. 5B is thus obtained as an output of flip-flop 19.

In the read-out mode, addresses are sequentially set by constant address clocks having frequency fsc so as to perform read out. When a next timing pulse shown in FIG. 5D is generated, it is supplied to clear terminal CL of address counter 21 via OR gate 20 so as to clear address counter 21. The period of the timing pulses is a 1-frame period. Therefore, the period from the generation of a timing pulse through the generation of a next timing pulse is 262 H. In this case, a write-in set signal is not supplied, flip-flop 19 is kept reset, and memory 15 is kept set in the read-out mode. Then, a clear pulse is output from multiplexer 26 at address 59832. The above operation is repeated to read out 263 H and 262 H periods alternately. Therefore, since the number of scan lines in the horizontal scan period is always an integer, the signal is continuous at the transient portion of adjacent fields and no skew occurs.

In this case, the sampling frequency of the D/A converters is set at 1 fsc, and sampling pulses for 3 samples are written at an address of memory 15 at one time. Therefore, the wavelength of the chrominance subcarrier wave corresponds to one address of memory 15, and the chrominance subcarrier wave is constantly continuous at the transient portion between adjacent fields. When the continuity of the chrominance subcarrier wave is deteriorated, an undesirable irregularity in color or decoloring occurs in the image, which leads to a great practical problem.

FIGS. 6A to 6E show a case of $\frac{1}{2}$ speed slow-motion reproduction in the SP mode of a VHS-type VTR. In this case, multiplexer 26 is controlled by a mode set signal for $\frac{1}{2}$ speed slow-motion reproduction in order to select an address decode value precisely corresponding to one field period. In other words, the address in this case is:

(455/2)×(525/2)−1≈59717.75

This value is rounded to an integer 59718. As a result, either in writing at every 4 fields or in reading at the remaining fields thereof, signal processing can be performed in units of 263.25 H field periods.

Therefore, although a skew of 0.25 H occurs at a transient portion between adjacent fields, it has a constant, predetermined value. Thus, even if a skew appears on the screen of a television receiver, it is in a predetermined amount in a predetermined direction, and does not stand out. In addition, since a pulse formed on the basis of the head switching pulse is used as the timing pulse, a skew occurs at an overscan portion 5 to 7 H prior to a vertical sync signal, and the horizontal AFC circuit of the television receiver performs tracking within the actual display period on the screen, thereby sufficiently suppressing the skew. In this case, the skew must occur only in a predetermined direction in a predetermined amount. If the skew varies in a range larger than several s or occurs in opposite directions, the residual skew appears on the upper portion of the screen to horizontally drift the image. The skew amount must also be about ½H at maximum. If the skew exceeds about ½H, its transient becomes very large, and a considerable distortion is generated at the upper portion of the screen.

FIGS. 7A to 7E show a case of ⅓ speed slow-motion tion in the EP mode of a VHS-type VTR. In this case, H/V becomes 263−1/6, write-in is performed once per every six fields, and readout is performed in the remaining fields. This operation is continuously performed. Multiplexer 26 is controlled to select the output of address decoder 25 corresponding to the 1-field period, i.e., the output corresponding to address value 59718, by a mode set signal. Thus, although a skew of −1/6 H occurs at a transient portion of adjacent fields, its skew amount is smaller than that of a case of ½ speed slow-motion reproduction shown in FIGS. 6A to 6E, and does not stand out on the screen.

In this manner, according to the present invention, the number H/V of horizontal scan lines within 1 field corresponding to the tape travel speed is obtained for still image reproduction, slow-motion reproduction, and high-speed reproduction. It is determined whether the obtained H/V is or is close to an integer, or is or close to a multiple of one-half. In the former case (when the relationship between the memory control period and H/V falls within the hatched regions of rightwardly oblique lines in FIG. 3), the obtained H/V corresponding to the 1 field period is selected as the value for address counter 25. In the latter case (when the relationship between the memory control period and H/V falls within the hatched regions of leftwardly oblique lines in FIG. 3), a value corresponding to (1 field period +½H) is selected as the value for address decoder 25, or a value corresponding to (1 field period −½H) is selected as the value for address decoder 25. These values are assigned to corresponding mode set signals. Therefore, at an arbitrary reproduction speed, a skew value can be reliably suppressed to a predetermined value less than ½H, e.g., ¼ and 1/6 H, which causes a practical problem.

Address decoder 25 is not a decoder for decoding the number of H periods, but a decoder for the addresses of memory 15. Therefore, even if the number of H/V varies due to the change in the horizontal frequency, the decoded value to be detected need not be changed, or the number of decoded values need not be increased.

The write-in signal, the timing pulse, and the mode set signal can be obtained by servo circuit 10c which controls travel of the tape in VTR main body 10 in FIG. 4, a system control logic circuit which controls the overall operation of the VTR, or the like. Especially, the mode set signal can be obtained by the microcomputer of the system control logic circuit.

In the above embodiment, the description is made under an assumption that the rotating speed of the video heads is 1 frame period per rotation, which is the same both in the recording mode and in the special reproduction mode. However, during the special reproduction mode, the rotating speed of the video heads may be changed in order to correct the horizontal frequency of the reproduced VTR signal. In this case, the decoded value of the address can be changed in accordance with the change in the field time.

Also, only one address value can be decoded, and connection of the decode inputs can be switched to substantially select a plurality of decoders.

When a light jitter is present in a timing pulse, the field period may be influenced thereby. However, when the jitter is as small as several s or less, it does not substantially influence the skew value and causes no problem. In the actual calculation, the decoded value is not an integer. However, even if the fractional decoded value is rounded to be an integer, only a small error in a range of 140 ns occurs at maximum, which causes no problem.

In the above embodiment, a field memory exemplifies memory 15. However, a frame memory can be used instead.

When slow-motion reproduction is obtained by intermittently driving the tape, the H/V value can temporarily vary from that shown in FIGS. 7A to 7E. In this case, the present invention can be applied by using a substantial H/V value based on the same principle.

As shown in FIGS. 5A to 5E, the field period changes in a mode wherein a field of (1 field period +½H) and a field of (1 field period −½H) appear repeatedly, resulting in vertical misalignment on the screen. In this case, vertical sync signal insertion circuit 24a may be connected to output terminal 24 as indicated by a broken line in FIG. 4, and a pseudovertical sync signal of a predetermined frequency may be inserted, thereby eliminating the vertical misalignment.

Address decoder 25 is designed to decode address value 59604 corresponding to V −½H, so that it can be operated in a mode wherein no timing pulse is supplied. This feature is utilized in a case wherein a broadcast video signal received and detected by a television tuner is directly written in or read out from a memory for the purpose of reproducing a temporary still image while VTR main body 10 shown in FIG. 4 is off.

As described above, an image memory control device according to the present invention can perform noiseless slow motion reproduction, still image reproduction, and high-speed reproduction at an arbitrary tape travel speed with a simple circuit configuration, and can suppress the skew value to a value not influencing the image on the screen.

What is claimed is:

1. An image memory control device for a video signal special reproduction system, said device comprising:
   special reproduction mode designating means for designating at least one special reproduction mode among still image reproduction, slow-motion reproduction, and high-speed reproduction;
   a video signal supply source for special reproduction for outputting a video signal to be subjected to special reproduction in a special reproduction mode which is designated by said special reproduction mode designating means;
   A/D converting means for A/D converting the video signal which is output from said video signal supply source for special reproduction to be subjected to special reproduction;

memory means having a memory capacity capable of storing about one field period of the video signal to be subjected to special reproduction which is A/D-converted by said A/D converting means;

write-in means for supplying a write signal for starting write-in of the video signal to be subjected to special reproduction which is A/D converted by said A/D converting means into said memory means at a predetermined timing and for stopping the write-in at elapsed about one field period of the video signal;

selection signal generating means for generating a first selection or a second selection signal when it is determined that the number of horizontal scan lines per field period of the video signal which is to be subjected to special reproduction in a mode designated by said special reproduction mode designating means is close to an integer or close to a multiple of one-half, respectively;

readout means for repeatedly reading out a number of times the video signal to be subjected to special reproduction which is written in said memory means, in response to a mode designated by said special reproduction mode designating means, by renewing a read-out address of said memory means into a starting address at elapsed one field period of the video signal when receiving said first selection signal or by renewing a read out address of said memory means into a starting address at elapsed sum or difference period between one field period of the video signal and $\frac{1}{2}$ horizontal scan period when receiving said second selection signal, so that the number of horizontal scan lines corresponding to a transient portion of adjacent fields of a readout video signal is constantly an integer or a multiple of one-half having a constant fraction smaller than $\pm \frac{1}{4}$; and D/A converting means for D/A-converting the video signal read out from said memory means, in order to obtain a special reproduction output.

2. A device according to claim 1, wherein said video signal supply source for special reproduction comprises a helical scan-type VTR having two heads or more.

3. A device according to claim 2, wherein said video signal supply source for special reproduction comprises a television tuner incorporated in said VTR.

4. A device according to claim 1, wherein said video signal supply source for special reproduction comprises a terminal which is coupled to an external video equipment.

5. A device according to claim 2, wherein said write-in means outputs the write signal in response to a head switch pulse for switching said heads at a timing 4.5 to 9 horizontal scan periods prior to generation of a vertical sync signal of a reproduced video signal from said VTR.

6. A device according to claim 1, said device further comprising pseudo-vertical sync signal inserting means for inserting a pseudo-vertical sync signal having a predetermined frequency in a special reproduced output which is D/A converted by said D/A converting means.

7. A device according to claim 1, said device further comprising signal speed matching means for matching a speed of an output signal from said A/D converting means with an operating speed of said memory means.

8. A device according to claim 7, wherein said signal speed matching means comprises means for converting a plurality of samples of the output signal from said A/D converting means from a serial signal to a parallel signal.

9. An image memory control device for a video signal special reproduction system, said device comprising:

special reproduction mode designating means for designating at least one special reproduction mode among still image reproduction, slow-motion reproduction, and high-speed reproduction;

a video signal supply source for special reproduction for outputting a video signal to be subjected to special reproduction in a special reproduction mode which is designated by said special reproduction mode designating means;

A/D converting means for A/D converting the video signal which is output from said video signal supply source for special reproduction to be subjected to special reproduction;

memory means having a memory capacity capable of storing about one field period of the video signal to be subjected to special reproduction which is A/D-converted by said A/D converting means;

timing signal generating means for generating a timing signal which is a pulse train having a frame frequency of the video signal;

pulse generating means for generating a first pulse at elapsed one field period of the video signal from generation of each pulse of said timing signal, and for generating a second pulse at elapsed sum or difference period between one field period of the video signal and $\frac{1}{2}$ horizontal scan period from generation of each pulse of said timing signal;

selection signal generating means for generating a first selection signal or a second selection signal when it is determined that the number of horizontal scan lines per field period of the video signal which is to be subjected to special reproduction in a mode designated by said special reproduction mode designating means is close to an integer or close to a multiple of one-half, respectively;

selecting means for selecting and supplying the first pulse from said pulse generating means when an output from said selection signal generating means is the second selection signal;

write-in means for starting write-in of the video signal to be subjected to special reproduction which is A/D converted by said A/D converting means into said memory means at a timing generated by a predetermined pulse of the timing signal, and for stopping the write-in by an output pulse from said selecting means generated following the timing signal;

readout means for repeatedly reading out a number of times the video signal to be subjected to special reproduction which is written in said memory means, in response to a mode designated by said special reproduction mode designating means, by renewing a read-out address of said memory means into a starting address by each pulse of the timing signal and the output pulse from said selecting means, so that the number of horizontal scan lines correspondidng to a transient portion of adjacent fields of a read out video signal is constantly an integer or a multiple of one-half having a constant fraction smaller than $\pm \frac{1}{4}$; and D/A converting means for D/A-converting the video signal read out from said memory means, in order to obtain a special reproduction output.

10. A device according to claim 9, wherein said video signal supply source for special reproduction comprises a helical scan-type VTR having two heads or more.

11. A device according to claim 10, wherein said video signal supply source for special reproduction comprises a television tuner incorporated in said VTR.

12. A device according to claim 9, wherein said video signal supply source for special reproduction comprises a terminal which is coupled to an external video equipment.

13. A device according to claim 10, wherein said timing signal generating means generates the timing signal in response to a head switch pulse for switching said heads at a timing 4.5 to 9 horizontal scan periods prior to generation of a vertical sync signal of a reproduced video signal from said VTR.

14. A device according to claim 9, wherein said pulse generating means comprise an address counter for controlling an address of said memory means, and an address decoder for generating the first and second pulses in accordance with address data output from said address counter.

15. A device according to claim 9, said device further comprising pseudo-vertical sync signal inserting means for inserting a pseudo-vertical sync signal having a predetermined frequency in a special reproduced output which is D/A converted by said D/A converting means.

16. A device according to claim 9, said device further comprising signal speed matching means for matching a speed of an output signal from said A/D converting means with an operating speed of said memory means.

17. A device according to claim 16, wherein said signal speed matching means comprises means for converting a plurality of samples of the output signal from said A/D converting means from a serial signal to a parallel signal.

* * * * *